US012503122B2

(12) United States Patent
Elder

(10) Patent No.: US 12,503,122 B2
(45) Date of Patent: Dec. 23, 2025

(54) SYSTEMS AND METHODS OF DETECTING TRAILER ANOMALIES USING A THERMAL SENSOR

(71) Applicant: TORC Robotics, Inc., Blacksburg, VA (US)

(72) Inventor: Nicholas Elder, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 188 days.

(21) Appl. No.: 18/224,532

(22) Filed: Jul. 20, 2023

(65) Prior Publication Data

US 2025/0026358 A1    Jan. 23, 2025

(51) Int. Cl.
*B60W 40/12* (2012.01)
*B60W 60/00* (2020.01)

(52) U.S. Cl.
CPC .......... *B60W 40/12* (2013.01); *B60W 60/001* (2020.02); *B60W 2300/145* (2013.01); *B60W 2422/70* (2013.01); *B60W 2530/20* (2013.01)

(58) Field of Classification Search
None
See application file for complete search history.

(56) References Cited

U.S. PATENT DOCUMENTS

| 2012/0215411 | A1* | 8/2012 | Seymour | B60T 8/885 701/70 |
| 2017/0082164 | A1* | 3/2017 | Serra | F16D 65/092 |
| 2017/0340908 | A1* | 11/2017 | Heath | A62C 37/44 |
| 2018/0257653 | A1* | 9/2018 | Seaman | B60W 50/029 |
| 2018/0370280 | A1* | 12/2018 | Akbarian | B60B 27/0068 |
| 2023/0234548 | A1* | 7/2023 | Suh | B60T 7/20 701/29.3 |
| 2024/0101082 | A1* | 3/2024 | Yilmaz | B60T 8/171 |

* cited by examiner

*Primary Examiner* — Peter D Nolan
*Assistant Examiner* — Jacob Kent Besteman-Street
(74) *Attorney, Agent, or Firm* — Armstrong Teasdale LLP

(57) ABSTRACT

An autonomous vehicle can include a tractor; a trailer coupled with the tractor; a thermal sensor coupled with the trailer, the thermal sensor configured to measure a temperature of the trailer; and one or more processors. The processors can be configured to receive a plurality of temperature measurements of the trailer from the thermal sensor while the autonomous vehicle is driving; compare the plurality of temperature measurements to a condition; and automatically execute a trailer anomaly response protocol responsive to determining at least one of the plurality of temperature measurements satisfies the condition.

20 Claims, 5 Drawing Sheets

SYSTEMS AND METHODS OF DETECTING TRAILER ANOMALIES USING A THERMAL SENSOR

TECHNICAL FIELD

The present disclosure relates generally to autonomous vehicles and, more specifically, to systems and methods for automatically detecting trailer anomalies of an autonomous vehicle using a thermal sensor.

BACKGROUND

The use of autonomous vehicles has become increasingly prevalent in recent years, with the potential for numerous benefits, such as improved safety, reduced traffic congestion, and increased mobility for people with disabilities. Autonomous vehicles, such as semi-trucks, can include tractors and trailers pulled by the tractors. Such autonomous vehicles may have difficulties detecting problems with the trailers because of disconnects between the trailers and the tractors. Undetected problems with trailers can compound until the problems become a road safety hazard for both the autonomous vehicles themselves and other vehicles and objects on the road.

SUMMARY

One common problem or symptom of a problem that autonomous vehicles face is excessive heat at the structures (e.g., wheel ends) holding the wheels of the autonomous vehicles in place. For example, a trailer of an autonomous vehicle may include one or more wheels that enable a tractor to pull the trailer on the road. Either the wheels themselves or the structures that maintain the positions of the wheels can overheat, for example, when not positioned properly on the frame of the trailer or a wheel has low air pressure or is flat. Such heat can cause fires on the trailer if not properly or timely attended to. Heat can also be a symptom of a shift in the structure of the trailer or an underinflated tire. Autonomous vehicles may not have a method of detecting the problems that cause the temperature increases or a method of detecting the temperature increases themselves.

An autonomous vehicle (or a semi-autonomous or non-autonomous vehicle) as described herein can overcome the aforementioned technical deficiencies. For example, an autonomous vehicle can be outfitted to include one or more thermal sensors. The thermal sensors can be configured to measure the temperature of the autonomous vehicle. In one example, individual thermal sensors can be configured to measure the temperature over time at different wheels or structures holding the wheels in place. The thermal sensors can transmit the temperature measurements to a processor of the autonomous vehicle as the thermal sensors generate the temperature measurements. The processor can analyze the measurements to determine whether there are any problems at any of the wheels.

For instance, the processor can compare temperature measurements to a condition, such as a threshold. The processor can periodically receive temperature measurements from the thermal sensors and compare each of the temperature measurements to the threshold. The processor can detect an anomaly from one or more of the temperature measurements responsive to determining the one or more temperature measurements exceed the temperature threshold.

The processor can select a trailer anomaly response protocol responsive to detecting an anomaly (e.g., a problem at a location being monitored by the processor through a thermal sensor). For example, the processor can detect an anomaly responsive to determining a temperature measurement satisfies a condition or otherwise exceeds a threshold. Responsive to detecting the anomaly, the processor can select a trailer anomaly response protocol from memory that causes the autonomous vehicle to slow down and/or pull off to the side of the road and stop. In some cases, the processor can select the trailer anomaly response protocol based on the sensor that provided the temperature measurement. For example, a thermal sensor that generates temperature measurements for a wheel on the right side of the autonomous vehicle may provide a temperature measurement that exceeds the threshold. The processor can identify the side of the vehicle on which the thermal sensor is located and control the autonomous vehicle based on the identified side to avoid swerving on the road. In some cases, the trailer anomaly response protocol can be or include activation of a lamp (e.g., a headlight, daytime running lights, taillights, brake lights, turn signal lights, reverse lights, fog lights, hazard lights, blinker lights, etc.). The processor can execute such a trailer anomaly response protocol to alert surrounding onlookers that the trailer is experiencing an anomaly, thus increasing safety on the road.

In at least one aspect, the present disclosure describes an autonomous vehicle. The autonomous vehicle can include a tractor; a trailer coupled with the tractor; a thermal sensor coupled with the trailer. The thermal sensor can be configured to measure a temperature of the trailer. The autonomous vehicle can include one or more processors. The one or more processors can be configured to receive a plurality of temperature measurements of the trailer from the thermal sensor while the autonomous vehicle is driving; compare the plurality of temperature measurements to a condition; and automatically execute a trailer anomaly response protocol responsive to determining at least one of the plurality of temperature measurements satisfies the condition.

In another aspect, the present disclosure describes a method. The method can include receiving, by one or more processors of an autonomous vehicle comprising a tractor and a trailer coupled with the tractor, a plurality of temperature measurements of the trailer from a thermal sensor while the autonomous vehicle is driving, the thermal sensor coupled with the trailer and configured to measure a temperature of the trailer; comparing, by the one or more processors, the plurality of temperature measurements to a condition; and automatically executing, by the one or more processors, a trailer anomaly response protocol responsive to determining at least one of the plurality of temperature measurements satisfies the condition.

In at least one aspect, the present disclosure describes an autonomous vehicle. The autonomous vehicle can include a vehicle body; and a thermal sensor coupled with the vehicle body. The thermal sensor can be configured to measure a temperature of the autonomous vehicle. The autonomous vehicle can include one or more processors. The one or more processors can be configured to receive a plurality of temperature measurements of the autonomous vehicle from the thermal sensor while the autonomous vehicle is driving; compare the plurality of temperature measurements to a condition; and automatically execute an anomaly response protocol responsive to determining at least one of the plurality of temperature measurements satisfies the condition.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
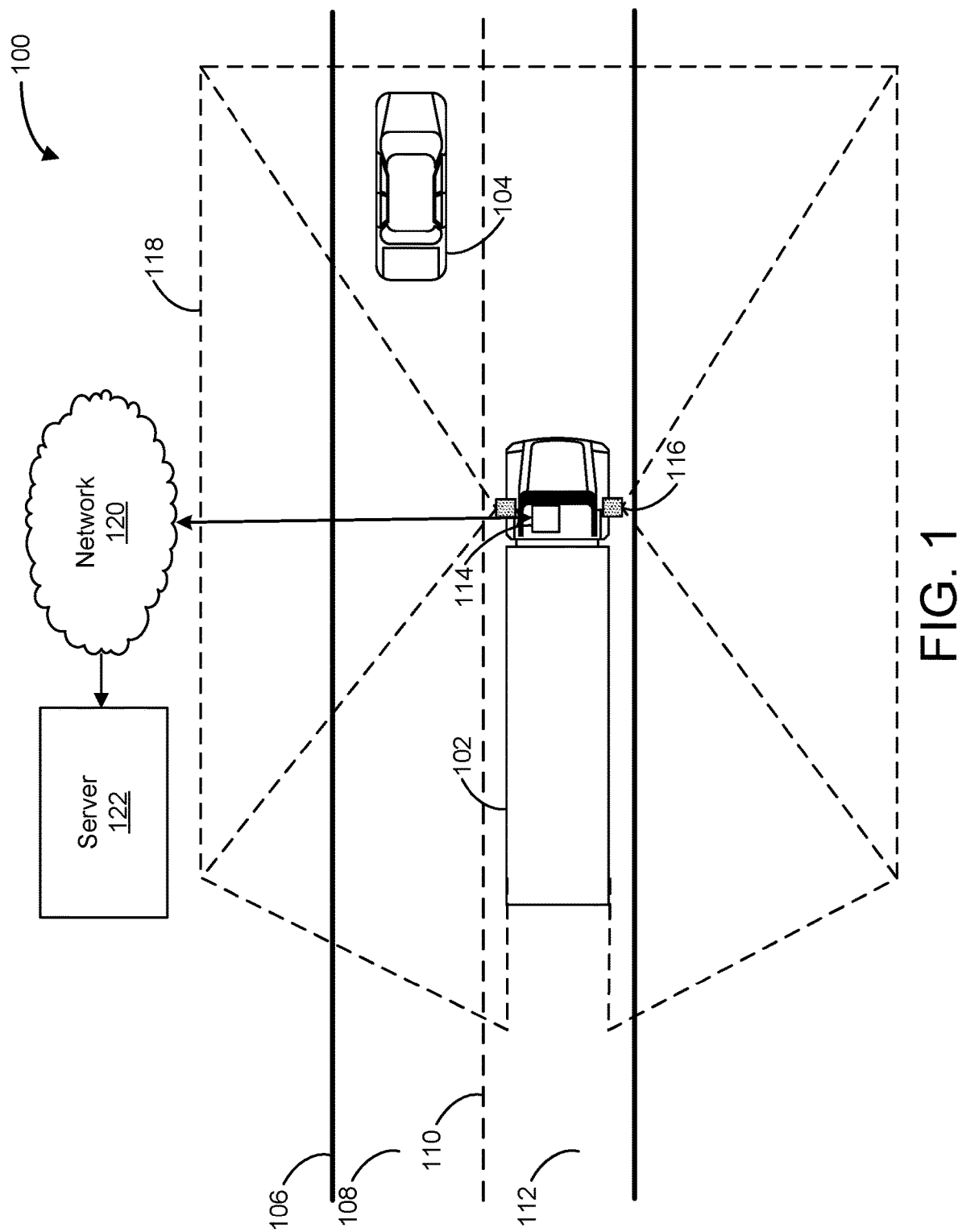
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality or not be autonomous at all. While the perception module 116 is depicted as being located at the front of the vehicle 102, the perception module 116 may be a part of a perception system with various sensors placed at different locations throughout the vehicle 102.

Figure 2:
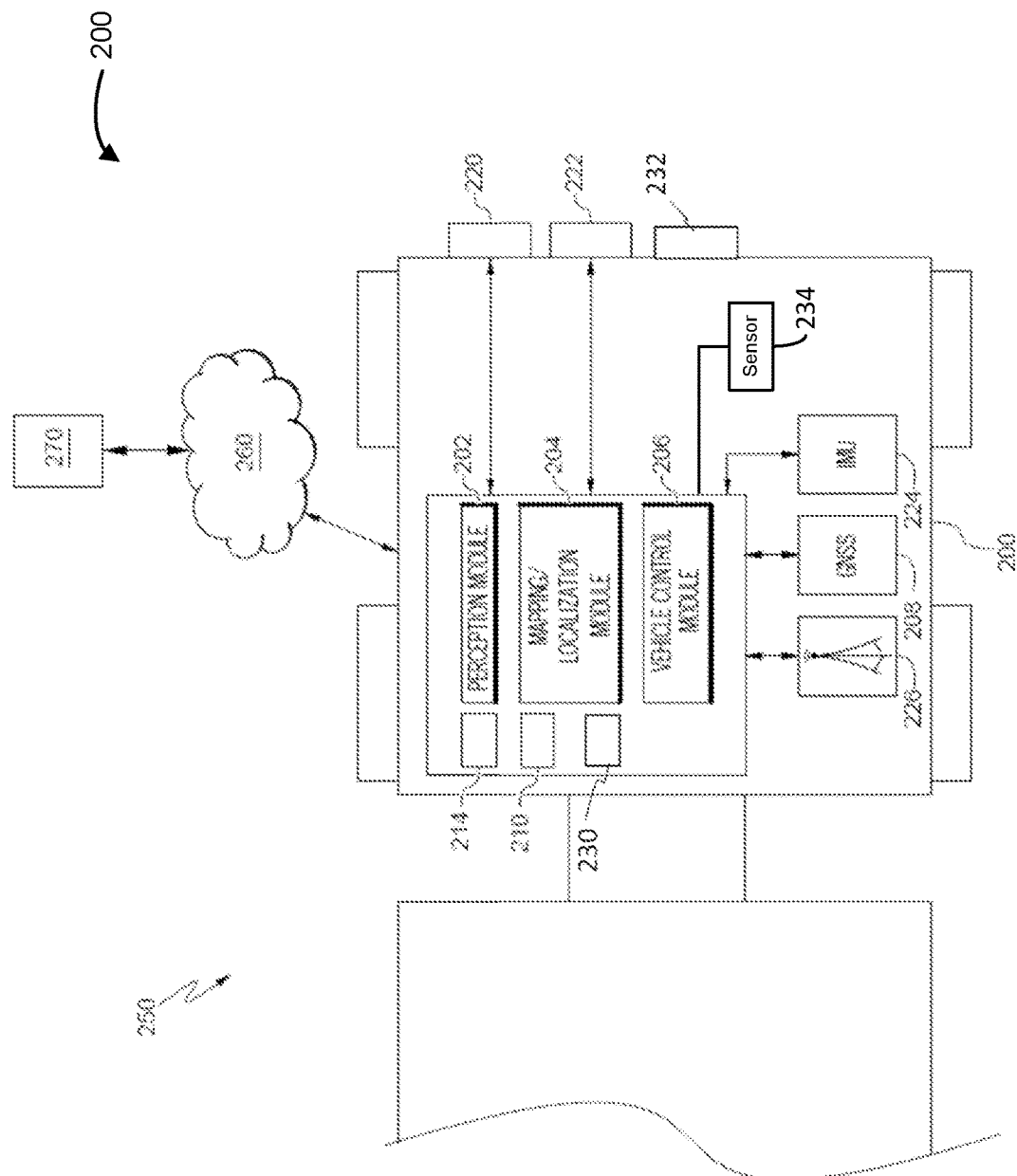
FIG. 2 is a system for detecting trailer anomalies using a thermal sensor, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a light detection and ranging (LiDAR) system 222, a radar system 232, a sensor 234, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The sensors 234 can be or include sensors located around the vehicle 200 that detect different characteristics of the vehicle 200. For example, the sensors 234 can include one or more thermal sensors. The thermal sensors can be or thermocouples, resistance temperature detectors, thermistors, infrared sensors, bimetallic strips, semiconductor temperature sensors, fiber optic sensors, thermal cameras, etc. The thermal sensors can be configured to measure temperature of the trailer at various locations of the vehicle 200. For example, the sensors 234 can be configured and/or coupled to the trailer of the vehicle 200. The sensors 234 can be coupled at (e.g., affixed to) individual wheel ends of wheels of the vehicle 200. The sensors 234 can generate temperature measurements at the wheel ends or the wheels as the vehicle 200 drives or while the vehicle 200 is stationary. The sensors 234 can transmit the temperature measurements to the processor 210 for processing.

The sensors 234 can be positioned around the trailer of the vehicle 200. The sensors 234 can generate temperature measurements for each of the individual wheels or set of wheels at a particular location. For example, different thermal sensors can be placed at different wheel ends of the trailer. Each thermal sensor can generate temperature measurements for the wheel end at which the thermal sensor is located or affixed and transmit the temperature measurements to the processor 210 for processing. Accordingly, the processor 210 can monitor the temperature of the different wheel ends of the trailer of the autonomous vehicle 200 to determine anomalies at the wheel ends.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single processor or microprocessor or multiple processor or microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 3:
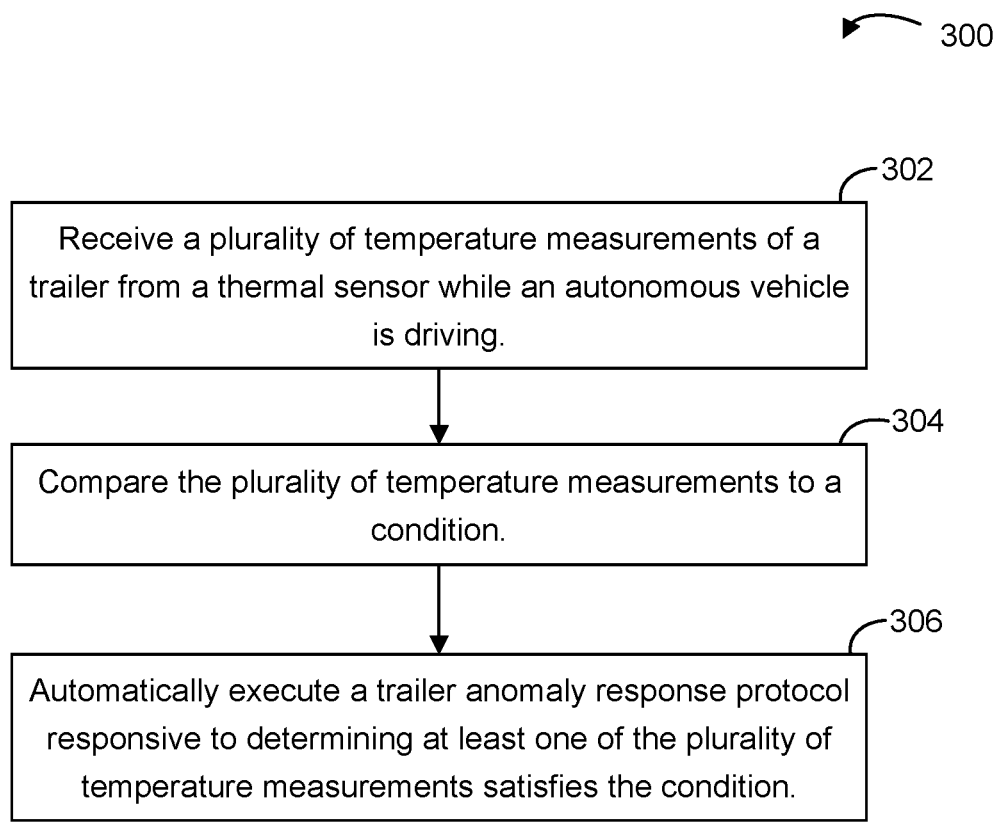
FIG. 3 is a method for detecting trailer anomalies using a thermal sensor, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, a trailer anomaly detection module 230, and the method 300 described herein with respect to FIG. 3. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.).

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.). The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The trailer anomaly detection module 230 can detect anomalies in the operation of a trailer of the vehicle 102. The trailer anomaly detection module 230 can detect such anomalies based on temperature measurements that the thermal sensors of the sensors 234 generate and transmit to the processor 210 for processing. For example, through the trailer anomaly detection module 230, the processor 210 can be configured to poll the sensors 234 at set time intervals or randomly. In some cases, the sensors 234 can be configured to automatically transmit temperature measurements to the trailer anomaly detection module 230 at set time intervals or randomly. The trailer anomaly detection module 230 can receive and analyze the temperature measurements. In doing so, the trailer anomaly detection module 230 can determine if the temperature measurements satisfy a condition that indicates an anomaly in the trailer.

For example, the trailer anomaly detection module 230 can compare temperature measurements that the trailer anomaly detection module 230 receives to a threshold (e.g., a temperature threshold). The trailer anomaly detection module 230 can detect an anomaly in the trailer in response to determining at least one temperature measurement exceeds the threshold (e.g., satisfies a condition) based on the comparison. The trailer anomaly detection module 230 can similarly receive and compare temperature measurements from any number of the sensors 234 to a threshold. Accordingly, the trailer anomaly detection module 230 can monitor different locations around the trailer to determine if there are any anomalies, such as fires or excessive heat that indicates a problem or anomaly.

Responsive to determining at least one temperature measurement satisfies a condition, the trailer anomaly detection module 230 can transmit a message or signal to the vehicle control module 206 indicating the satisfaction of the condition. The message or signal can indicate an identification of the sensor that transmitted the at least one temperature measurement that satisfies the condition and/or include a flag indicating satisfaction of the condition. The vehicle control module 206 can receive the message or signal and select a trailer anomaly response protocol (e.g., executable instructions to cause the vehicle 200 to perform a specific action or function) to execute based on the flag and/or identification of the sensor in the message or signal.

The vehicle control module 206 can select the trailer anomaly response protocol from memory. The trailer anomaly response protocol can be or include a function or action of the vehicle 200, such as a navigational action or a non-navigational action. Examples of navigational actions can include reducing the velocity of the vehicle 200, turning the vehicle 200, pulling the vehicle 200 to the side of the road, etc. Examples of non-navigational actions can include flashing one or more lamps of the vehicle, emitting a sound out of a speaker, or transmitting a message to the remote server 270. The vehicle control module 206 can select one or more of such trailer anomaly response protocols from memory in response to receiving the message or signal from the trailer anomaly detection module 230. The vehicle control module 206 can automatically execute the one or more selected trailer anomaly response protocols.

In some cases, the trailer anomaly detection module 230 can select the trailer anomaly response protocol to transmit to the vehicle control module 206. In such cases, the trailer anomaly detection module 230 can select the trailer anomaly response protocol and transmit the selected trailer anomaly response protocol to the vehicle control module 206. The vehicle control module 206 can execute the selected trailer anomaly response protocol to cause the vehicle 200 to perform the action or function associated with the selected trailer anomaly response protocol.

FIG. 3 shows execution steps of a processor-based method using the system 250, according to some embodiments. The method 300 shown in FIG. 3 comprises execution steps 302-306. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a data processing system stored or on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

Using the method 300, the data processing system may detect anomalies in a trailer of an autonomous vehicle. The data processing system can do so using thermal sensors that are coupled with the trailer. For example, an autonomous vehicle (or any other type of vehicle, such as a semi-autonomous or manually driven vehicle) may include one or more thermal sensors that are located at different points or locations on a trailer of the autonomous vehicle. The thermal sensors can be configured to generate temperature readings of a specific location on the trailer. In some cases, the thermal sensors can be positioned or coupled with wheel ends of the trailer. Such thermal sensors can generate temperature measurements indicating the temperature at the wheel ends. The thermal sensors can transmit temperature measurements to the data processing system over time and/or as the autonomous vehicle is driving. The data processing system can analyze the temperature measurements against one or more conditions or thresholds. Responsive to determining a temperature measurement exceeds a threshold, for example, or another condition, the data processing system can execute a trailer anomaly response protocol. In this way, the data processing system can monitor and automatically react to anomalies that are present on the trailer.

For example, at step 302, the data processing system receives a plurality of temperature measurements of a trailer of an autonomous vehicle. The data processing system can receive the plurality of temperature measurements (e.g., values in degrees Fahrenheit or Celsius) from thermal sensors located, coupled, or positioned around the trailer or the autonomous vehicle. The data processing system may be stored locally at (e.g., in) the autonomous vehicle or be remote from the autonomous vehicle. The plurality of sensors may be located at (e.g., on) a surface (e.g., an outer surface) of the autonomous vehicle. In some cases, the individual sensors of the plurality of sensors can be located at different wheels or wheel ends of the trailer. The thermal sensors may be or include thermocouples, resistance temperature detectors, thermistors, infrared sensors, bimetallic strips, semiconductor temperature sensors, fiber optic sensors, etc. The thermal sensors may be configured to generate temperature measurements of the temperature at the different locations (e.g., specific wheels or wheel ends) on the trailer.

The data processing system can receive the plurality of temperature measurements while the autonomous vehicle is driving or while the autonomous vehicle is stationary. The data processing system can receive the temperature measurements over time. The data processing system can receive the temperature measurements by polling the different thermal sensors at set intervals or randomly. In some cases, the thermal sensors can transmit the temperature measurements to the data processing system at set time intervals or randomly.

At step 304, the data processing system compares the plurality of temperature measurements to a condition. The data processing system can compare the plurality of temperature measurements to the condition as the data processing system receives the temperature measurements.

Comparing the plurality of temperature measurements to the condition can include comparing the plurality of temperature measurements to a threshold (e.g., a temperature threshold). For example, the data processing system can receive temperature measurements from the thermal sensors located around the trailer over time. Responsive to receiving the temperature measurements, the data processing system can compare the temperature measurements to a threshold. The data processing system can determine a condition is satisfied responsive to determining at least one of the temperature measurements exceeds or otherwise satisfies the threshold.

In some cases, the data processing system can use a time threshold to determine a condition is satisfied. For example, the data processing system can receive a temperature measurement from a thermal sensor of the autonomous vehicle. The data processing system can compare the temperature measurement to a temperature threshold. The data processing system can determine the temperature measurement exceeds the temperature threshold based on the comparison. Responsive to determining the temperature measurement exceeds the temperature threshold, the data processing system can instantiate and/or start a timer. The data processing system can identify temperature measurements that are received from the same thermal sensor that generated the temperature measurement exceeding the temperature threshold. The data processing system can compare the identified temperature measurements to the temperature threshold. The data processing system can cause the timer to continue incrementing (e.g., incrementing every second or other defined time interval). The data processing system can continue incrementing the timer as the data processing system determines temperature measurements from the thermal sensor exceed the temperature threshold. The data processing system can periodically compare the time of the timer to a time threshold while incrementing the timer. The data processing system can repeat this process until determining the time of the timer exceeds the time threshold. Responsive to determining the time of the timer exceeds the time threshold, the data processing system can determine a condition is satisfied and detect an anomaly. By doing so, the data processing system can reduce false positives in anomaly detection of the trailer.

The data processing system can determine start and/or instantiate a timer based on multiple temperature measurements from the same thermal sensor. For example, the data processing system can start a timer responsive to determining a temperature measurement from a thermal sensor exceeds a temperature threshold. In some cases, the data processing system can start the timer responsive to determining a defined number of temperature measurements exceeds the temperature threshold, a defined number of temperature measurements within a defined time period exceeds the temperature threshold, or consecutively received temperature measurements received for a defined time period exceed the temperature threshold. The data processing system can start the timer and increment or update the timer as the data processing system receives and determines temperature measurements from the same sensor exceed the temperature threshold.

The data processing system can stop or bring a timer back to zero responsive to determining a temperature measurement from a sensor associated with the timer is less than the temperature threshold. For example, the data processing system can receive a temperature measurement from the thermal sensor that the data processing system determines is less than the temperature threshold. Responsive to determining the temperature measurement is less than the temperature threshold, the data processing system can reset the timer back to zero. In some cases, the data processing system can reset the timer back to zero responsive to determining a defined number of temperature measurements are less than the temperature threshold, a defined number of temperature measurements within a defined time period are less than the temperature threshold, or consecutively received temperature measurements received for a defined time period are less than the temperature threshold. The data processing system may not start or restart the timer from zero until identifying another temperature measurement from the thermal sensor that exceeds the threshold or otherwise satisfies another condition.

The data processing system can similarly maintain and update timers for any number of thermal sensors. For example, the data processing system can maintain and update a separate timer for each thermal sensor that is coupled with the trailer. The data processing system can similarly compare temperature measurements that the data processing system receives from each of the thermal sensors to the temperature threshold. The data processing system can similarly operate the timer of each thermal sensor to detect anomalies or conditions that are satisfied by thermal measurements from each of the thermal sensors.

In some cases, instead of using timers, the data processing system can use counters (e.g., temperature measurement counters) to determine or detect anomalies in temperature measurements or satisfied conditions. For example, the data processing system can receive a temperature measurement from a thermal sensor of the autonomous vehicle. The data processing system can compare the temperature measurement to a temperature threshold. The data processing system can determine the temperature measurement exceeds the temperature threshold based on the comparison. Responsive to determining the temperature measurement exceeds the temperature threshold, the data processing system can instantiate and/or increment a counter. The data processing system can identify temperature measurements that are received from the same thermal sensor that generated the temperature measurement exceeding the temperature threshold. The data processing system can compare the identified temperature measurements to the temperature threshold. The data processing system can increment the counter (e.g., increment the counter by one or another defined value) for each temperature measurement from the thermal sensor that exceeds the temperature threshold. The data processing system can continue incrementing the timer for each temperature measurement from the thermal sensor that exceeds the temperature threshold. The data processing system can periodically compare the count of the counter to a count threshold while incrementing the counter. The data processing system can repeat this process until determining the count of the counter exceeds the count threshold. Responsive to determining the count of the counter exceeds the count threshold, the data processing system can determine a condition is satisfied and detect an anomaly. The data processing system can reset the counter responsive to determining a temperature measurement from the thermal sensor is below the temperature threshold or otherwise in a similar manner to the manner described above for the timer. The data processing system can similarly maintain and update individual counters for each thermal sensor coupled with the trailer.

At step 306, the data processing system automatically executes a trailer anomaly response protocol. The data processing system can automatically execute the trailer anomaly response protocol responsive to determining at least one of the plurality of temperature measurements satisfies the condition. A trailer anomaly response protocol can be or include a function that the autonomous vehicle can perform, such as a navigational action or a non-navigational action. Examples of navigational actions can include reducing the velocity of the autonomous vehicle, turning the autonomous vehicle, pulling the autonomous vehicle to the side of the road, etc. Examples of non-navigational actions can include flashing one or more lamps of the vehicle, emitting a sound out of a speaker, or transmitting a message to a remote server. Responsive to determining a condition is satisfied (e.g., determining a temperature measurement exceeds a temperature threshold, determining temperature measurements exceed a temperature threshold for a time period having a length or duration exceeding a time threshold, etc.), the data processing system can select a trailer anomaly response protocol from memory and automatically execute the trailer anomaly response protocol.

The data processing system can select the trailer anomaly response protocol based on the thermal sensor that transmitted the temperature measurements that the data processing system determined satisfy a condition. For example, the data processing system can store a plurality of trailer anomaly response protocols in memory. The data processing system can store associations between identifications of the different thermal sensors and different trailer anomaly response protocols in memory. Individual thermal sensors may be associated with one or more trailer anomaly response protocols in memory. The data processing system can determine temperature measurements from the thermal sensor satisfy a condition. Responsive to such a determination, the data processing system can identify the thermal sensor that provided the temperature measurements to the data processing system. The data processing system can identify and select any trailer anomaly response protocols with stored associations with the identified thermal sensor in memory. The data processing system can automatically execute the selected trailer anomaly response protocol or protocols.

In some cases, the data processing system can select a trailer anomaly response protocol based on the wheel that corresponds to a thermal sensor that provided one or more temperature measurements that satisfy a condition. For example, different trailer anomaly response protocols can have stored associations in memory with different wheels of the trailer. Such trailer anomaly response protocols can be, for example, directions or changes in direction to steer the autonomous vehicle (e.g., in the opposite or the same direction as the location of the wheel relative to the other wheels of the autonomous vehicle), magnitudes of the direction or the change in direction, a side of the road to which to pull over, etc. The different thermal sensors coupled with the trailer can have stored associations in memory with the different wheels. The data processing system can identify a thermal sensor that provided one or more thermal measurements that satisfy a condition and identify the wheel that corresponds to the thermal sensor. The data processing system can identify and/or select any trailer anomaly response protocols that correspond with the identified wheel. The data processing system can execute the selected trailer anomaly response protocol.

The data processing system can control the autonomous vehicle to perform any type of trailer anomaly response protocol. For example, the data processing system can identify a location of the wheel (e.g., identify the location of the wheel from memory) that corresponds to an anomaly or temperature measurements that satisfy a condition. Responsive to identifying the location, the data processing system can execute a trailer anomaly response protocol to steer based on the location (e.g., steer in the opposite or the same direction as the location of the wheel relative to the other wheels of the autonomous vehicle or steer towards a side of the road opposite or the same side as the wheel). In another example, the data processing system can activate a lamp (e.g., a headlight, daytime running lights, taillights, brake lights, turn signal lights, reverse lights, fog lights, hazard lights, blinker lights, etc.). In another example, the data processing system can transmit an indication of the satisfied condition to a remote server. Such can be advantageous for automatic monitoring of autonomous vehicles. In another example, the data processing system can cause the autonomous vehicle to slow down and/or stop (e.g., pull to the side of the road and stop). Trailer anomaly response protocols can cause the autonomous vehicle to perform any action.

The data processing system can execute (e.g., automatically execute) trailer anomaly response protocols based on data from any number of thermal sensors. For example, the data processing system can receive a plurality of temperature measurements from a second thermal sensor located, coupled, or affixed to a second wheel of the trailer. The data processing system can compare the plurality of second temperature measurements to the condition. The data processing system can automatically execute the trailer anomaly response protocol responsive to determining at least one of the plurality of measurements from the second thermal sensor satisfies the condition.

In some cases, the data processing system may not control the autonomous vehicle. In such cases, the data processing system can transmit an indication of the anomaly, any measurements or identifications of conditions that were satisfied, and/or any other data regarding the anomaly, to a controller of the autonomous vehicle. The controller can receive the data and select a trailer anomaly response protocol from memory. The controller can select the anomaly response protocol from memory based on the received data similar to the data processing system, as described above. In some cases, the data processing system can select the trailer anomaly response protocol and transmit the trailer anomaly response protocol to the controller. The controller can execute the trailer anomaly response protocol selected by the controller or received from the data processing system to control the autonomous vehicle.

In some cases, an autonomous vehicle without a tractor or a trailer may use the anomaly detection systems and methods as described herein to detect anomalies. For example, an autonomous vehicle can include a vehicle body and one or more thermal sensors coupled with the vehicle body. The one or more thermal sensors can be configured to measure a temperature at different locations of the autonomous vehicle. In some cases, the thermal sensors can be located at or otherwise configured to measure the temperature at different wheels or wheel ends of the autonomous vehicle. A data processing system of the autonomous vehicle similar to the data processing system described above can be configured to receive temperature measurements of the autonomous vehicle from the thermal sensors. The data processing system may receive such temperature measurements while the autonomous vehicle is driving or is stationary. The data processing system can compare the plurality of temperature measurements to a condition, similar to the above. The data processing system can automatically execute an anomaly response protocol (e.g., a protocol similar to a trailer anomaly response protocol) responsive to determining at least one of the plurality of temperature measurements satisfies the condition.

Figure 4A:
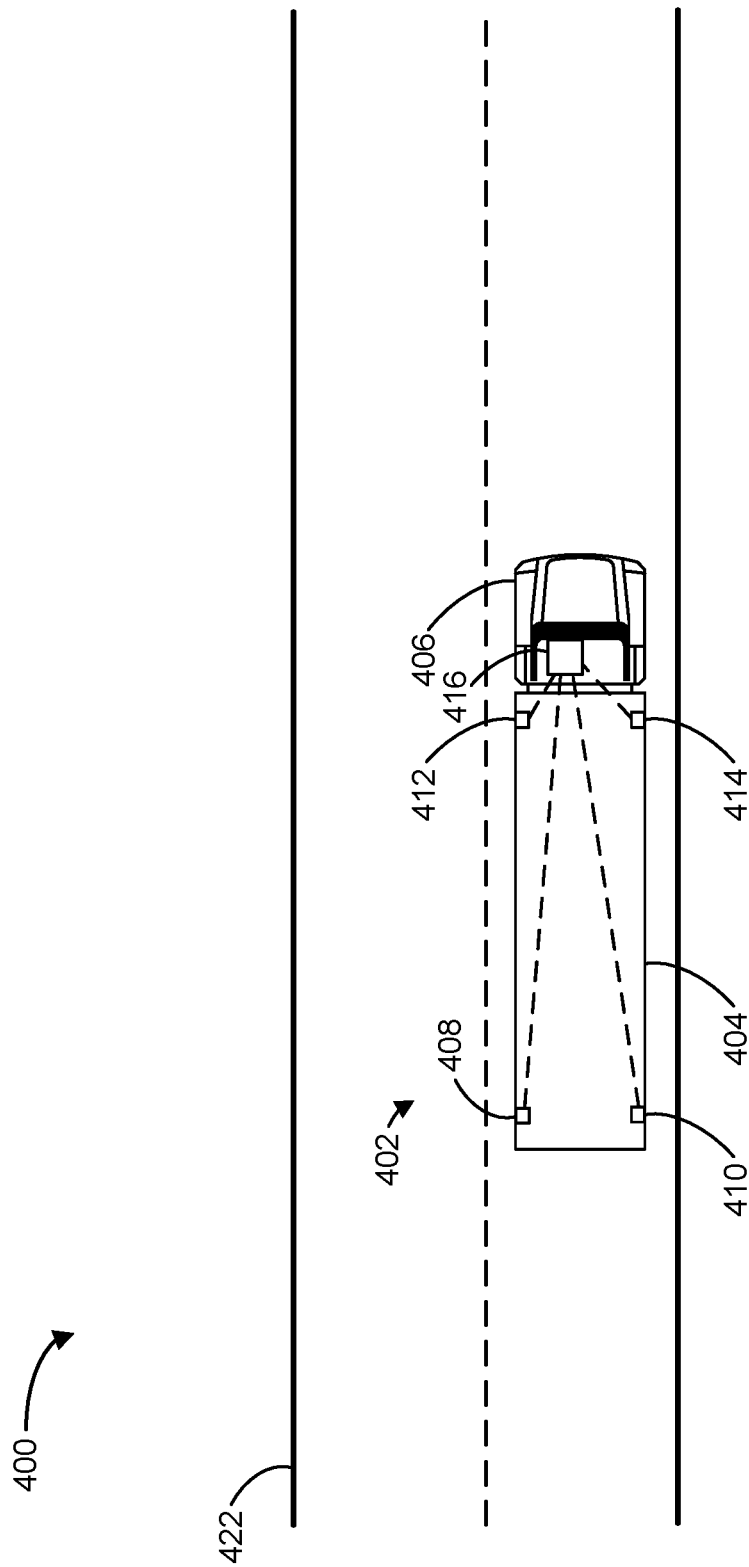
FIG. 4A depicts a bird's-eye view of a roadway scenario of detecting trailer anomalies using a thermal sensor, according to an embodiment.

FIG. 4A depicts a bird's-eye view of a roadway scenario of detecting trailer anomalies using a thermal sensor, according to an embodiment. FIG. 4A illustrates an environment 400 that includes a vehicle 402. The vehicle 402 can be the same as or similar to the vehicle 102. The vehicle 402 can include a trailer 404 and a tractor 406. The vehicle 402 can include sensors 408, 410, 412, and 414. The sensors 408, 410, 412, and 414 can be coupled with or otherwise located on the trailer 404. The sensors 408, 410, 412, and 414 can be sensors of the sensors 234. The vehicle 402 can include a data processing system 416. The data processing system 416 can include one or more processors and memory. The data processing system 416 can be the same as or similar to the autonomy system 250, as described with reference to FIG. 2. The data processing system 416 can be located in or on the tractor 406.

One or more of the sensors 408, 410, 412, and 414 can generate temperature measurements at different locations of the vehicle 402. The one or more sensors 408, 410, 412, and 414 can do so as the vehicle 402 travels down a road 422 and/or while the vehicle 402 is stationary. The sensors 408, 410, 412, and 414 can transmit the temperature measurements to the data processing system 416. The data processing system 416 can receive the temperature measurements, process the temperature measurements to detect any anomalies in the temperature measurements, and control the autonomous vehicle 402 based on such detected anomalies.

For example, the sensors 408, 410, 412, and 414 can, over time, generate and respectively transmit temperature measurements indicating the current temperature at different locations of the trailer 404 to the data processing system 416. The data processing system 416 can receive the temperature measurements. The data processing system 416 can use the temperature measurements to determine whether one or more conditions (e.g., a temperature measurement exceeds a temperature threshold, a time period of temperature measurements exceeding the temperature threshold has a duration or length that exceeds a time threshold, etc.) are satisfied. The data processing system can detect an anomaly at a location of the trailer 404 responsive to determining temperature measurements associated with the location satisfy a condition. The data processing system can select and/or execute a trailer anomaly response protocol in response to or based on determining the condition is satisfied.

The vehicle 402 can include thermal sensors (e.g., the sensors 408, 410, 412, and 414) at (e.g., coupled to or affixed to) any location of the vehicle 402. For example, the vehicle 402 can include one or more thermal sensors at the rear of the trailer 404 or tractor 406, on the side of the trailer 404 or tractor 406, on a top surface of the trailer 404 or tractor 406, etc. Each of such sensors can be configured to measure the temperature at the location at which the sensor is located. The sensors can transmit the temperature measurements to the data processing system 416. The data processing system 416 can determine whether there are any anomalies at the respective locations of the sensors using the same or a similar method to the method described above. Responsive to determining one or more temperature measurements of one of the sensors satisfy a condition, the data processing system 416 can select (e.g., based on the location of the sensor) and/or execute a trailer anomaly response protocol.

Figure 4B:
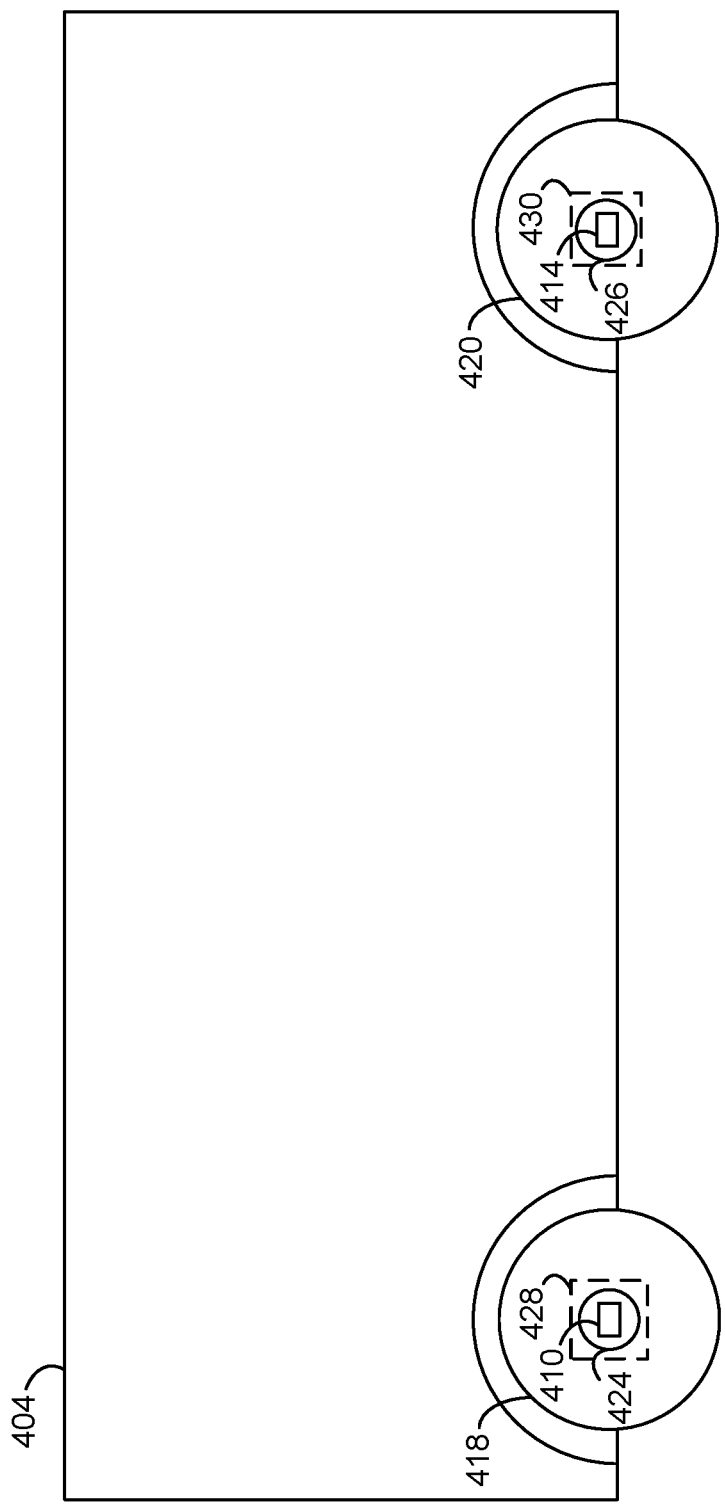
FIG. 4B depicts a side-view of a trailer of an autonomous vehicle for detecting trailer anomalies using a thermal sensor, according to an embodiment.

FIG. 4B depicts a side-view of the trailer 404, according to an embodiment. As illustrated in FIG. 4B, the sensors 410 and 414 can be located on separate wheels 418 and 420, respectively, of the trailer 404. The sensors 410 and 414 can be located on or coupled to wheel ends 424 and 426 of the wheels 418 and 420. The sensors 408 and 412 can be similarly located on or coupled to wheels or wheel ends on the opposite side of the trailer 404. The sensors 410 and 414 can generate temperature measurements at the wheels 418 and 420 or the wheel ends 424 and 426. The sensors 410 and 414 can transmit such temperature measurements to the data processing system 416 to use to detect anomalies in the temperatures of the wheels 418 and 420 or the wheel ends 424 and 426. The data processing system 416 can use the location of the sensors 408 and 412 on the wheels 418 and 420 or the wheel ends 424 and 426 from which the anomaly was detected to select which trailer anomaly response protocol to use or execute to control the autonomous vehicle 402.

In some cases, one or more of the sensors 408, 410, 412, or 414 can be thermal cameras. The thermal cameras can be positioned near or adjacent to (e.g., within a foot, two feet, or three feet) a rear license plate of the tractor 406. The thermal cameras can be aimed at axles 428 or 430 holding the wheels 418 and 420 in place such that the fields of view of the thermal cameras can respectively include the trailer axles 428 and 430. In some cases, portions of the fields of view of the thermal cameras may be obstructed while the axles 428 and 430 respectively remain in the fields of view of the thermal cameras. The thermal cameras can generate images (e.g., thermal images) from infrared data that illustrate the surface temperature of the objects depicted in the infrared data, such as the axles 428 or 430. The thermal cameras can transmit the generated images to the data processing system 416 for further processing.

The data processing system 416 can receive and detect anomalies from the images generated by the thermal cameras. For example, the data processing system 416 can analyze the images to determine or extract temperature measurements of the axles 428 and 430 from each of the images. The data processing system 416 can compare one or more of such temperature measurements of the axles 428 and 430 to a threshold or another condition as described above (e.g., the data processing system 416 can compare temperature measurements of consecutively received images from the thermal sensors to a temperature threshold and/or use a time threshold or count threshold do determine if a condition is satisfied). The data processing system 416 may detect an anomaly responsive to determining one or more of the temperature measurements satisfy a condition. Responsive to detecting an anomaly or a satisfied condition, the data processing system 416 can select (e.g., based on the axle from which the anomalous temperature measurements were determined) which trailer anomaly response protocol to use or execute to control the autonomous vehicle 402. Thermal cameras can be used in this manner to detect anomalies in axles of trailers, tractors, or other trucks or vehicles.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:
   a tractor;
   a trailer coupled with the tractor;
   a thermal sensor coupled with the trailer, the thermal sensor configured to measure a temperature of the trailer; and one or more processors, wherein the one or more processors are configured to:
receive a plurality of temperature measurements of the trailer from the thermal sensor while the autonomous vehicle is driving;
compare the plurality of temperature measurements to a condition by:
determining that at least one of the plurality of temperature measurements satisfies a temperature threshold associated with the condition;
instantiating a counter to count each temperature measurement of the at least one of the plurality of temperature measurements determined to satisfy the temperature threshold;
incrementing the counter for each temperature measurement of the at least one of the plurality of temperature measurements determined to satisfy the temperature threshold; and
determining that a count associated with the counter satisfies a count threshold associated with the condition; and
automatically execute a trailer anomaly response protocol responsive to determining, based at least in part on the count satisfying the count threshold, the at least one of the plurality of temperature measurements satisfies the condition.

2. The autonomous vehicle of claim 1, wherein the thermal sensor is configured to measure the temperature at a wheel of the trailer.

3. The autonomous vehicle of claim 2, further comprising:
a second thermal sensor coupled with the trailer, the second thermal sensor configured to measure a second temperature at a second wheel of the trailer,
wherein the one or more processors are configured to update an individual counter for each sensor coupled with the trailer, including, for the second thermal sensor:
receive a plurality of second temperature measurements at the second wheel of the trailer from the second thermal sensor;
compare the plurality of second temperature measurements to the condition by:
determining that at least one of the plurality of second temperature measurements satisfies the temperature threshold associated with the condition;
instantiating a second counter to count each temperature measurement of the at least one of the plurality of second temperature measurements determined to satisfy the temperature threshold;
incrementing the second counter for each temperature measurement of the at least one of the plurality of second temperature measurements determined to satisfy the temperature threshold; and
determining that a second count associated with the second counter satisfies the count threshold associated with the condition; and
automatically execute the trailer anomaly response protocol responsive to determining, based at least in part on the second count satisfying the count threshold, the at least one of the plurality of second measurements satisfies the condition.

4. The autonomous vehicle of claim 1, wherein the one or more processors are further configured to:
determine the at least one temperature measurement satisfies the condition responsive to determining the at least one temperature measurement exceeds the temperature threshold.

5. The autonomous vehicle of claim 1, wherein the one or more processors are further configured to:
reset the counter responsive to determining one of the plurality of temperature measurements does not satisfy the temperature threshold.

6. The autonomous vehicle of claim 1, wherein the autonomous vehicle comprises a plurality of wheels, and wherein the one or more processors are further configured to:
determine which wheel of the plurality of wheels corresponds to the at least one of the plurality of temperature measurements that satisfies the condition; and
select the trailer anomaly response protocol from a plurality of trailer anomaly response protocols based on the determined wheel.

7. The autonomous vehicle of claim 6, wherein the one or more processors are configured to automatically execute the trailer anomaly response protocol by controlling direction of movement of the autonomous vehicle based on a location of the determined wheel on the autonomous vehicle.

8. The autonomous vehicle of claim 1, wherein the one or more processors are configured to automatically execute the trailer anomaly response protocol by activating a lamp of the autonomous vehicle.

9. The autonomous vehicle of claim 1, wherein the one or more processors are configured to automatically execute the trailer anomaly response protocol by transmitting an indication of the satisfied condition to a remote computing device.

10. The autonomous vehicle of claim 1, wherein the one or more processors are configured to automatically execute the trailer anomaly response protocol by causing the autonomous vehicle to stop.

11. A computer-implemented method, comprising:
receiving, by one or more processors of an autonomous vehicle comprising a tractor and a trailer coupled with the tractor, a plurality of temperature measurements of the trailer from a thermal sensor while the autonomous vehicle is driving, the thermal sensor coupled with the trailer and configured to measure a temperature of the trailer;
comparing, by the one or more processors, the plurality of temperature measurements to a condition by:
determining that at least one of the plurality of temperature measurements satisfies a temperature threshold associated with the condition;
instantiating a counter to count each temperature measurement of the at least one of the plurality of temperature measurements determined to satisfy the temperature threshold;
incrementing the counter for each temperature measurement of the at least one of the plurality of temperature measurements determined to satisfy the temperature threshold; and
determining that a count associated with the counter satisfies a count threshold associated with the condition; and
automatically executing, by the one or more processors, a trailer anomaly response protocol responsive to determining, based at least in part on the count satisfying the count threshold, the at least one of the plurality of temperature measurements satisfies the condition.

12. The computer-implemented method of claim 11, wherein the thermal sensor is configured to measure the temperature at a wheel of the trailer.

13. The computer-implemented method of claim 12, further comprising:
updating, by the one or more processors, an individual counter for each sensor coupled with the trailer, including:
receiving, by the one or more processors, a plurality of second temperature measurements of the trailer from a second thermal sensor coupled with the trailer, the second thermal sensor configured to measure a second temperature at a second wheel of the trailer;
comparing, by the one or more processors, the plurality of second temperature measurements to the condition by:
determining that at least one of the plurality of second temperature measurements satisfies the temperature threshold associated with the condition;
instantiating a second counter to count each temperature measurement of the at least one of the plurality of second temperature measurements determined to satisfy the temperature threshold;
incrementing the second counter for each temperature measurement of the at least one of the plurality of second temperature measurements determined to satisfy the temperature threshold; and
determining that a second count associated with the second counter satisfies the count threshold associated with the condition; and
automatically executing, by the one or more processors, the trailer anomaly response protocol responsive to determining, based at least in part on the second count satisfying the count threshold, the at least one of the plurality of second measurements satisfies the condition.

14. The computer-implemented method of claim 11, wherein the computer-implemented method further comprises:
determining, by the one or more processors, the at least one temperature measurement satisfies the condition responsive to determining the at least one temperature measurement exceeds the temperature threshold.

15. The computer-implemented method of claim 11, wherein the computer-implemented method further comprises:
resetting, by the one or more processors, the counter responsive to determining one of the plurality of temperature measurements does not satisfy the temperature threshold.

16. The computer-implemented method of claim 11, wherein the autonomous vehicle comprises a plurality of wheels, and the computer-implemented method further comprises:
determining, by the one or more processors, which wheel of the plurality of wheels corresponds to the at least one of the plurality of temperature measurements that satisfies the condition; and
selecting, by the one or more processors, the trailer anomaly response protocol from a plurality of trailer anomaly response protocols based on the determined wheel.

17. The computer-implemented method of claim 16, wherein automatically executing the trailer anomaly response protocol comprises controlling, by the one or more processors, direction of movement of the autonomous vehicle based on a location of the determined wheel on the autonomous vehicle.

18. An autonomous vehicle, comprising:
a vehicle body;
a thermal sensor coupled with the vehicle body, the thermal sensor configured to measure a temperature of the autonomous vehicle; and
one or more processors, wherein the one or more processors are configured to:
receive a plurality of temperature measurements of the autonomous vehicle from the thermal sensor while the autonomous vehicle is driving;
compare the plurality of temperature measurements to a condition by:
determining that at least one of the plurality of temperature measurements satisfies a temperature threshold associated with the condition;
instantiating a counter to count each temperature measurement of the at least one of the plurality of temperature measurements determined to satisfy the temperature threshold;
incrementing the counter for each temperature measurement of the at least one of the plurality of temperature measurements determined to satisfy the temperature threshold; and
determining that a count associated with the counter satisfies a count threshold associated with the condition; and
automatically execute an anomaly response protocol responsive to determining, based at least in part on the count satisfying the count threshold, the at least one of the plurality of temperature measurements satisfies the condition.

19. The autonomous vehicle of claim 18, wherein the thermal sensor is configured to measure the temperature at a wheel of the trailer.

20. The autonomous vehicle of claim 19, further comprising:
a second thermal sensor coupled with the vehicle body, the second thermal sensor configured to measure a second temperature at a second wheel of the autonomous vehicle,
wherein the one or more processors are configured to update an individual counter for each sensor coupled with the trailer, including, for the second thermal sensor:
receive a plurality of second temperature measurements at the second wheel of the autonomous vehicle from the second thermal sensor;
compare the plurality of second temperature measurements to the condition by:
determining that at least one of the plurality of second temperature measurements satisfies the temperature threshold associated with the condition;
instantiating a second counter to count each temperature measurement of the at least one of the plurality of second temperature measurements determined to satisfy the temperature threshold;
incrementing the second counter for each temperature measurement of the at least one of the plurality of second temperature measurements determined to satisfy the temperature threshold; and
determining that a second count associated with the second counter satisfies the count threshold associated with the condition; and automatically execute the anomaly response protocol responsive to determining, based at least in part on the second count satisfying the count threshold, the at least one of the plurality of second measurements satisfies the condition.

\* \* \* \* \*